(12) United States Patent
Smith (10) Patent No.: US 7,088,011 B2
(45) Date of Patent: Aug. 8, 2006

(54) MOTOR-GENERATOR SYSTEM WITH A CURRENT CONTROL FEEDBACK LOOP

(76) Inventor: Raymond W. Smith, 5 Madonna Cres, Chatham, Ont N7L 1X7 (CA)

( * ) Notice: Subject to any disclaimer, the term of this patent is extended or adjusted under 35 U.S.C. 154(b) by 143 days.

(21) Appl. No.: 10/719,247

(22) Filed: Nov. 21, 2003

(65) Prior Publication Data

US 2005/0162134 A1    Jul. 28, 2005

(51) Int. Cl.
| | |
|---|---|
| *F01C 13/00* | (2006.01) |
| *F02N 11/00* | (2006.01) |
| *H02J 1/00* | (2006.01) |
| *H02P 9/14* | (2006.01) |
| *H02K 21/12* | (2006.01) |

(52) U.S. Cl. ............ 290/38 R; 290/4 R; 290/7; 322/7; 322/46; 310/156.39; 310/156.01; 310/156.53

(58) Field of Classification Search ........... 322/7, 322/46, 39, 4; 290/4 R, 4 C, 38 R, 38 A, 290/7; 310/74, 156.01, 156.53, 156.39
See application file for complete search history.

(56) References Cited

U.S. PATENT DOCUMENTS

| | | | | |
|---|---|---|---|---|
| 29,149 | A | | 7/1860 | Durham |
| 912,074 | A | * | 2/1909 | Clark ............... 318/826 |
| 1,259,307 | A | * | 3/1918 | Snow ............... 60/711 |
| 1,681,005 | A | * | 8/1928 | Melton ............. 307/84 |
| 1,685,052 | A | * | 9/1928 | Greene ............. 310/93 |
| 2,376,421 | A | * | 5/1945 | Drake .............. 322/9 |
| 2,783,393 | A | * | 2/1957 | Lindahl et al. ..... 307/64 |
| 3,558,901 | A | * | 1/1971 | Jacobus ........... 290/30 R |
| 3,609,426 | A | * | 9/1971 | Gaul ............... 322/4 |
| 3,934,964 | A | | 1/1976 | Diamond |
| 4,302,683 | A | * | 11/1981 | Burton ............. 290/4 R |
| 4,439,720 | A | * | 3/1984 | Georges ........... 322/4 |
| 4,570,077 | A | * | 2/1986 | Lambley ........... 290/4 R |
| 4,663,536 | A | * | 5/1987 | Roesel et al. ...... 290/7 |
| 4,709,203 | A | * | 11/1987 | Roux et al. ....... 322/87 |
| 5,252,552 | A | | 10/1993 | Yee |

(Continued)

FOREIGN PATENT DOCUMENTS

CA    2 307 870 A    11/2001

(Continued)

OTHER PUBLICATIONS

Angrist S W, "Perpetual Motion Machines", Scientific American, Scientific American Inc. (New York), vol. 218, pp. 114-122, (Dec. 1, 1968).

(Continued)

*Primary Examiner*—Darren Schuberg
*Assistant Examiner*—Julio Gonzalez (57) ABSTRACT

A motor-generator system with a current control feedback loop for generating electrical energy in stationary, portable, and automotive applications. The generator includes a housing defining an interior space and including a first portion and a second portion; an electric motor assembly positioned within the first portion of the housing, and operationally coupled to a shaft member for selectively rotating the shaft member; an electric generator assembly positioned within the second portion of the housing and operationally coupled to the shaft member for converting mechanical rotation into electrical energy, the electric generator assembly including a current output for supplying electrical current; and a control assembly operationally coupled between the electric generator assembly and the electric motor assembly the control assembly providing a control current to the electric motor assembly for controlling a speed of rotation induced into the shaft member by the electric motor assembly.

24 Claims, 9 Drawing Sheets

U.S. PATENT DOCUMENTS

| | | |
|---|---|---|
| 5,372,474 A | 12/1994 | Miller |
| 5,996,344 A | 12/1999 | Frenette et al. |
| 6,009,707 A | 1/2000 | Alkhamis |
| 6,087,750 A | 7/2000 | Raad |
| 6,087,791 A * | 7/2000 | Maruyama ................. 318/140 |
| 6,094,011 A * | 7/2000 | Notsu ......................... 315/78 |
| 6,239,513 B1 * | 5/2001 | Dean et al. ................... 307/64 |
| 6,507,128 B1 * | 1/2003 | King et al. ............... 290/40 C |
| 6,617,725 B1 * | 9/2003 | Rose, Sr. .................... 310/74 |
| 6,731,032 B1 * | 5/2004 | Muszynski ............... 310/68 B |
| 6,753,619 B1 * | 6/2004 | Stevenson et al. .......... 290/1 R |

FOREIGN PATENT DOCUMENTS

| | | |
|---|---|---|
| FR | 943 541 A | 3/1949 |
| FR | 2 657 474 | 7/1991 |
| GB | 705 010 A | 3/1954 |
| GB | 2 054 975 | 2/1981 |
| WO | 91/04603 A | 4/1991 |
| WO | 00/72431 A | 11/2000 |

OTHER PUBLICATIONS

PCT Search Report.

* cited by examiner

MOTOR-GENERATOR SYSTEM WITH A CURRENT CONTROL FEEDBACK LOOP

BACKGROUND OF THE INVENTION

1. Field of the Invention

The present invention relates to electrical generators and more particularly pertains to a new motor-generator system with a current control feedback loop for producing electric current in a highly efficient manner.

2. Description of the Prior Art

The use of electrical generators is known in the prior art. Examples include U.S. Pat. Nos. 5,252,552; 6,087,750; 5,372,474; 5,996,344; 3,934,964; 29,149; and 6,009,707.

While these devices fulfill their respective, particular objectives and requirements, the need remains for a system that can be used in stationary, portable, and automotive applications to provide electrical energy efficiency with low start-up energy requirements.

SUMMARY OF THE INVENTION

The present invention meets the needs presented above by providing a low energy start-up system with a n electrical current output which may be conditioned for the needs of each specific application through the use of convention step-up or step-down transformers.

An advantage of the present invention is to provide a new generator that has a lightweight magnetic drive wheel for the electric motor assembly making hand driven mechanical startup practical.

Another advantage of the present invention is the current control loop modified by the control assembly to control the speed of rotation of the electric motor assembly.

Still yet another advantage of the present invention is the use of multiple bearing plates to support the shaft member at both ends as well as medially.

Even still another advantage of the present invention is the wheeled stand assembly to facilitate portable applications of the motor generator assembly.

To this end, the present invention generally comprises a housing defining an interior space and including a first portion and a second portion; an electric motor assembly positioned within the first portion of the housing, and operationally coupled to a shaft member for selectively rotating the shaft member; an electric generator assembly positioned within the second portion of the housing and operationally coupled to the shaft member for converting mechanical rotation into electrical energy, the electric generator assembly including a current output for supplying electrical current; and a control assembly operationally coupled between the electric generator assembly and the electric motor assembly the control assembly providing a control current to the electric motor assembly for controlling a speed of rotation induced into the shaft member by the electric motor assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 9 thereof, a new motor-generator system with a current control feedback loop embodying the principles and concepts of the present invention will be described.

As best illustrated in FIGS. 1 through 9, the generator 10 generally comprises a housing, an electric motor assembly 20, an electric generator assembly 60, and a control assembly 63.

The housing 20 defines an interior space, and includes a first portion 21 and a second portion 22. The electric motor assembly 20 is positioned within the first portion 21 of the housing 20. The electric motor assembly 20 is operationally coupled to a shaft member 65. The electric motor assembly 20 selectively rotates the shaft member 65. The electric generator assembly 60 is operationally coupled to the shaft member 65, and converts mechanical rotation into electrical energy. The electric generator assembly 60 is positioned within the second portion 22 of the housing 20. The electric generator assembly 60 includes a current output for supplying electrical current. The control assembly 63 is operationally coupled between the electric generator assembly 60 and the electric motor assembly 20. The control assembly 63 provides a control current to the electric motor assembly 20 for controlling a speed of rotation induced into the shaft member 65 by the electric motor assembly 20.

Figure 1:
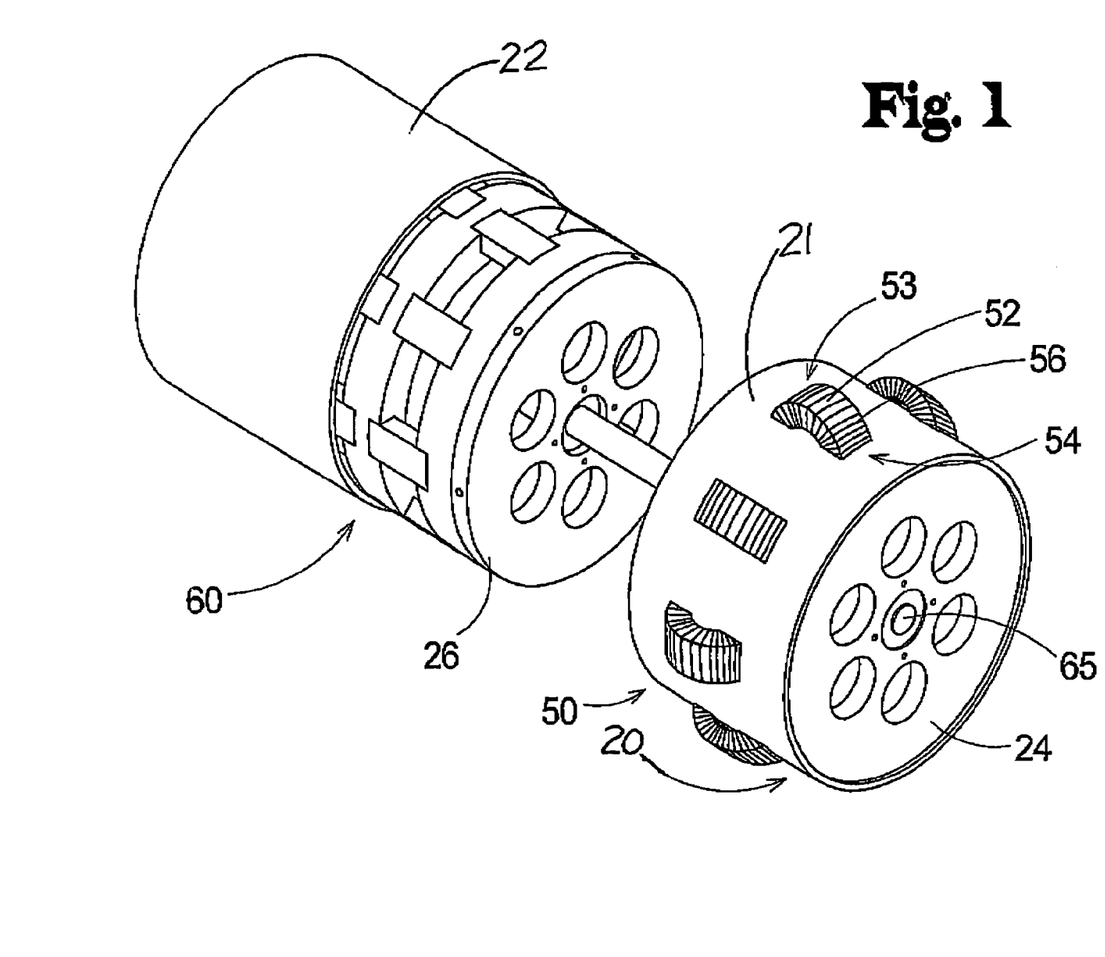
FIG. 1 is a schematic exploded perspective view of a new generator according to the present invention.
Figure 2:
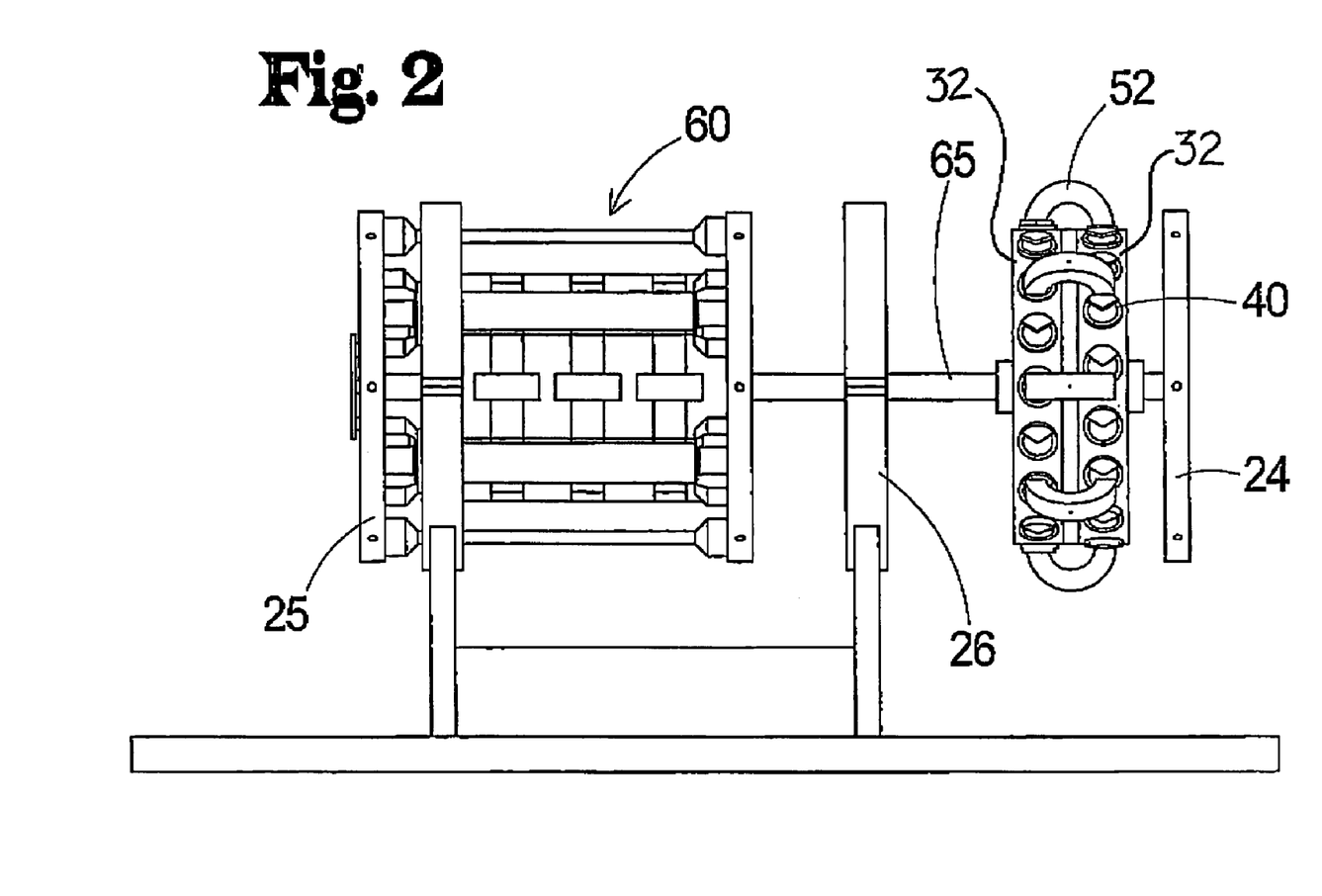
FIG. 2 is a schematic side view of the present invention with the housing removed.
Figure 3:
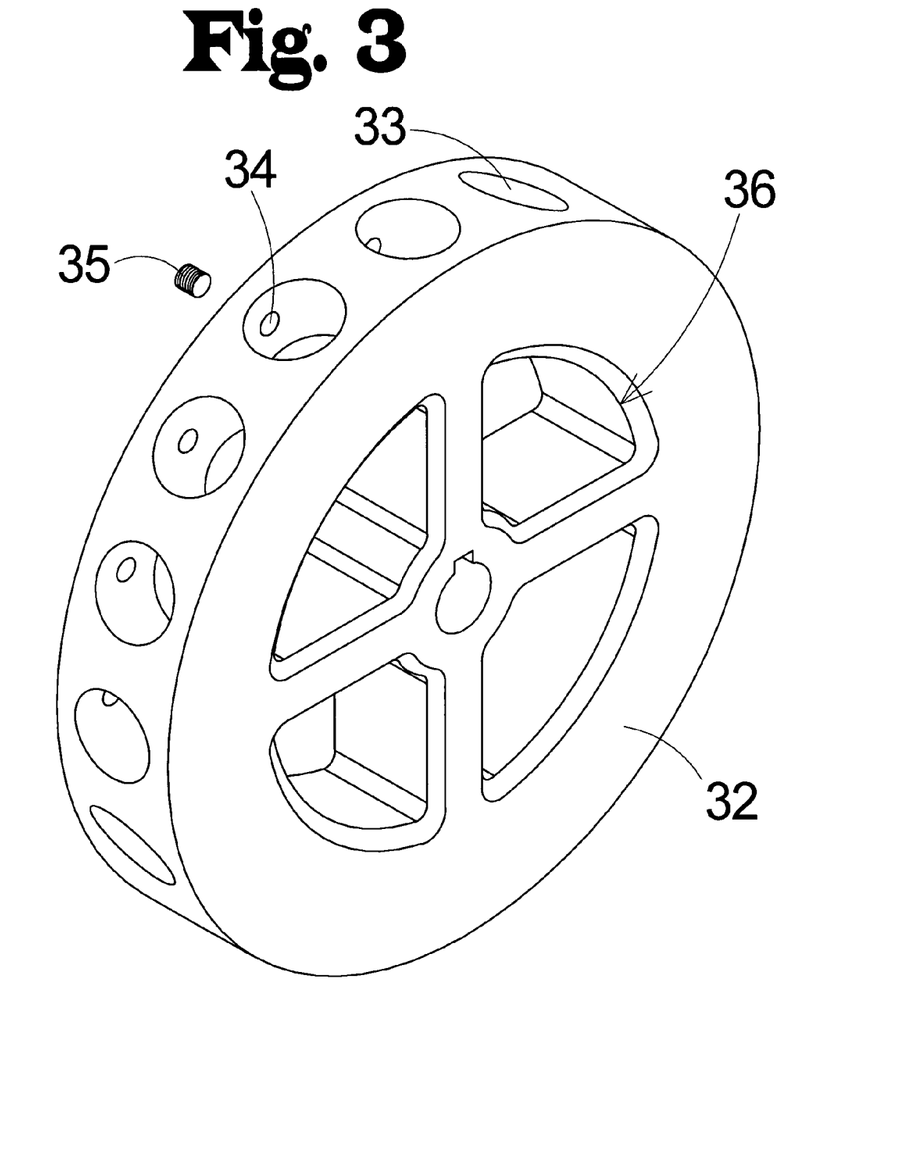
FIG. 3 is a schematic perspective view of the magnetic drive wheel of the present invention.
Figure 4:
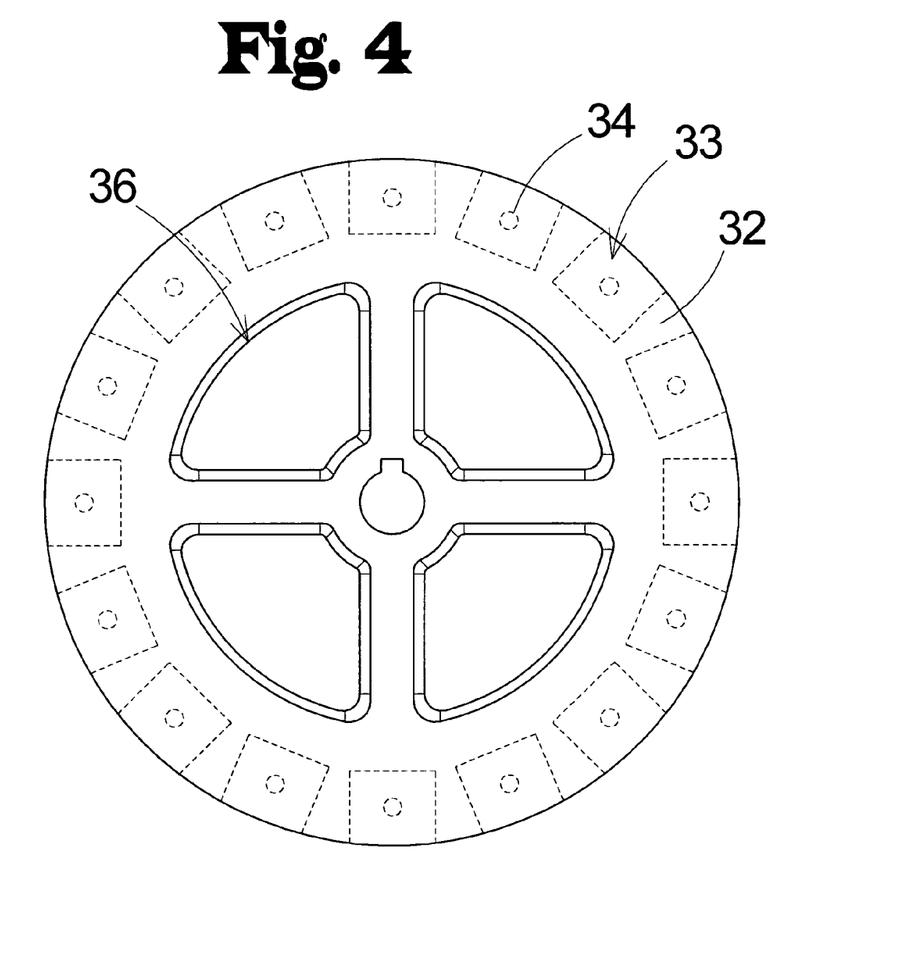
FIG. 4 is a schematic side view of the magnetic drive wheel of the present invention.

Preferably, the electric motor assembly 20 includes a pair of magnetic drive wheels 32. Each one of the pair of magnetic drive wheels 32 has a plurality of bores 33 extending radially into the perimeter side wall. Each one of the bores 33 is for receiving an associate one of a plurality of magnetic assemblies 40. A plurality of apertures 34 extends through a first side of the magnetic drive wheel 32 into an associated one of the bores 33 for selectively receiving a securing member 35 to secure an associated one of the magnetic assemblies 40 into the associated one of the plurality of bores 33. A plurality of voids 36 extends from a first side of the magnetic drive wheel 32 through to a second side of the magnetic drive wheel 32. The voids 36 provide weight reduction for the magnetic drive wheel. The plurality of voids 36 is positioned symmetrically through the magnetic drive wheel 32 to maintain rotationally balance of the magnetic drive wheel 32.

In an embodiment the magnetic drive wheel 32 comprises a polymeric material to minimize weight of the magnetic drive wheel 32.

Figure 6:
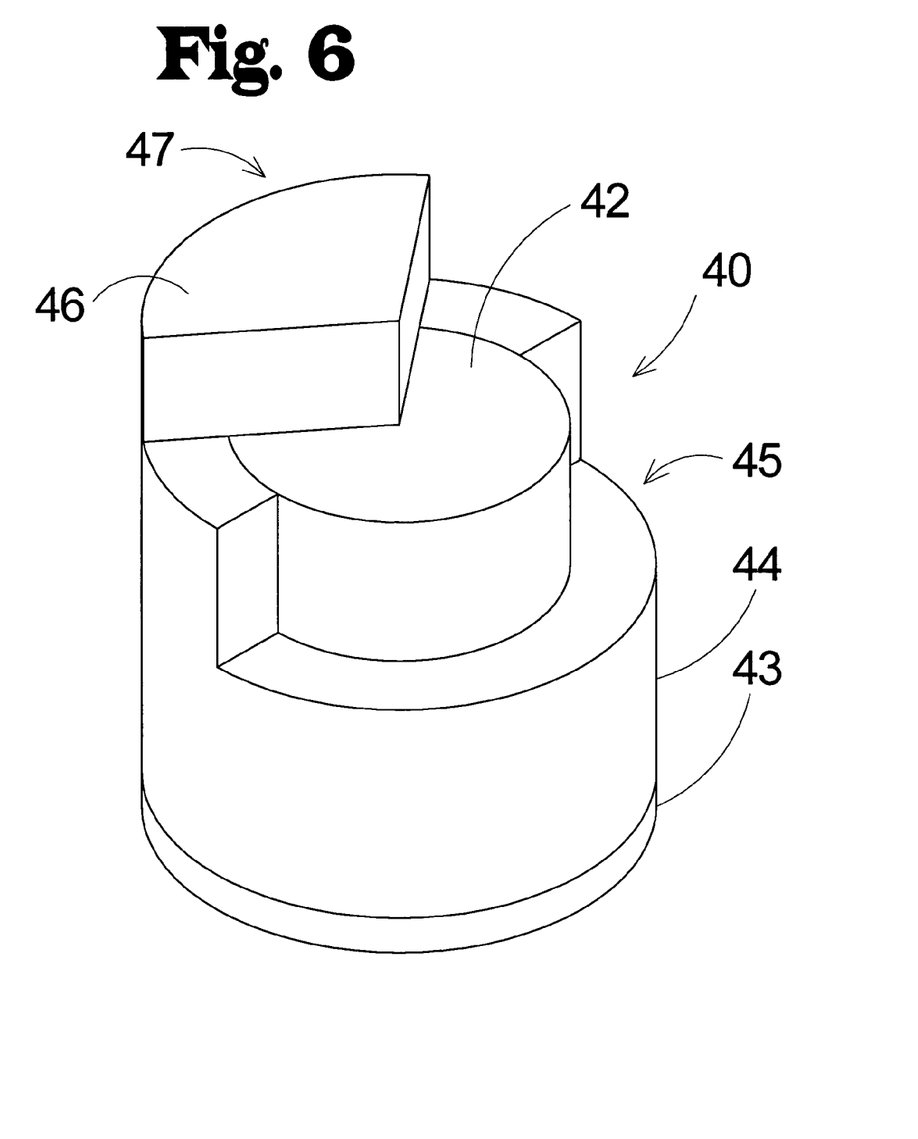
FIG. 6 is a schematic perspective front view of the magnetic assembly of the present invention.

In a further embodiment each one of the plurality of magnetic assemblies 40 further comprises a rare earth magnet 42, a bottom cap member 43, a perimeter wall 44, and a top cap member 46. The rare earth magnetic 42 has a generally cylindrical form. The bottom cap member 43 is preferably operationally coupled to the rare earth magnet 42. The perimeter wall 44 extends upward from the bottom cap member 43 and substantially envelops a perimeter of the rare earth magnet 42. The perimeter wall 44 has a notch portion 45 extending downward from a top edge of the perimeter wall 44. The top cap member 46 is operationally coupled to the perimeter wall 44, and abuts a top portion of the rare earth magnet 42. The top cap member 46 is preferably an arcuate segment. The bottom cap member 43, the perimeter wall 44, and the top cap member 46 are steel for directing magnetic lines of flux.

In still a further embodiment an outer edge 47 of the arcuate segment top cap member 46 extends through an arc of 80 degrees.

In an embodiment the stator assembly 50 further comprises a plurality of rare earth magnets 52 and a plurality of coil members 56. Each one of the plurality of rare earth magnets 52 has a general horse-shoe shape with complementary poles portioned on each end 53,54 of the horse shoe shape. Each one of the plurality of coil members 56 is wrapped around an associated one of the plurality of horse show shaped rare earth magnets 52. Each one of the plurality of coil member 56 is operationally coupled to the control assembly 63.

In an embodiment a first one of the pair of magnetic drive wheels 32 is offset from a second one of the pair of magnetic drive wheels 32. Thus, the magnetic assemblies 40 of the first one of the pair of magnetic drive wheels 32 are not aligned with the magnetic assemblies 40 of the second one of the pair of magnetic drive wheel 32.

Preferably, the magnetic assemblies 40 of the first one of the pair of magnetic drive wheels 32 is aligned with a first end 53 of the horse shoe shaped rare earth magnet 52 of the stator assembly 50. Each one of the magnetic assemblies 40 of the first one of the pair of magnetic drive wheels 32 includes a first magnetic polarity. The first end 53 of the horse shoe shaped rare earth magnet 52 of the stator assembly 50 includes an identical first magnetic polarity. Thus, the first end 53 of the horse shoe shaped rare earth magnet 52 of the stator assembly 50 repels each one of the magnetic assemblies 40 of the first one of the pair of magnetic drive wheels 32. Similarly, the magnetic assemblies 40 of the second one of the pair of magnetic drive wheels 32 is aligned with a second end 54 of the horse shoe shaped rare earth magnet 52 of the stator assembly 50. Each one of the magnetic assemblies 40 of the second one of the pair of magnetic drive wheels 32 includes a second magnetic polarity. The second end 54 of the horse shoe shaped rare earth magnet 52 the stator assembly 50 includes an identical second magnetic polarity. Thus, the second end 54 of the horse shoe shaped rare earth magnet 52 of the stator assembly 50 repels each one of the magnetic assemblies 40 of the second one of the pair of magnetic drive wheels 32.

Figure 7:
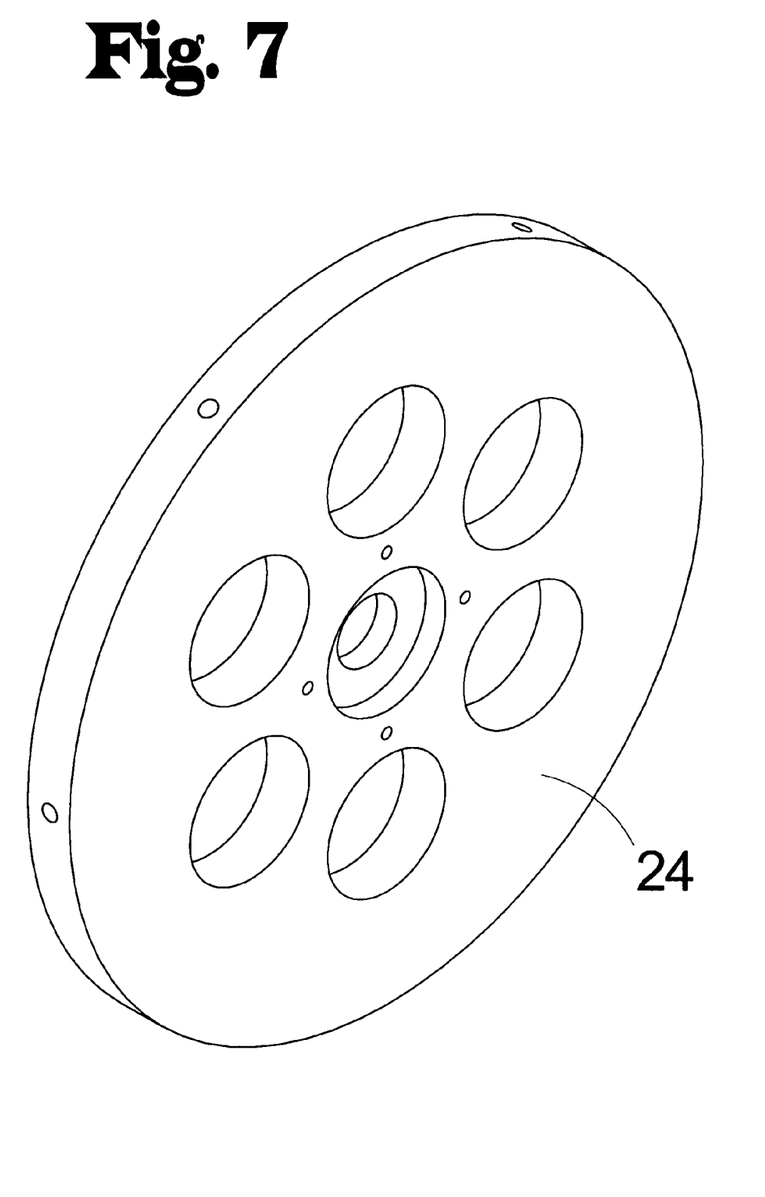
FIG. 7 is a schematic perspective view of the bearing plate of the present invention.
Figure 8:
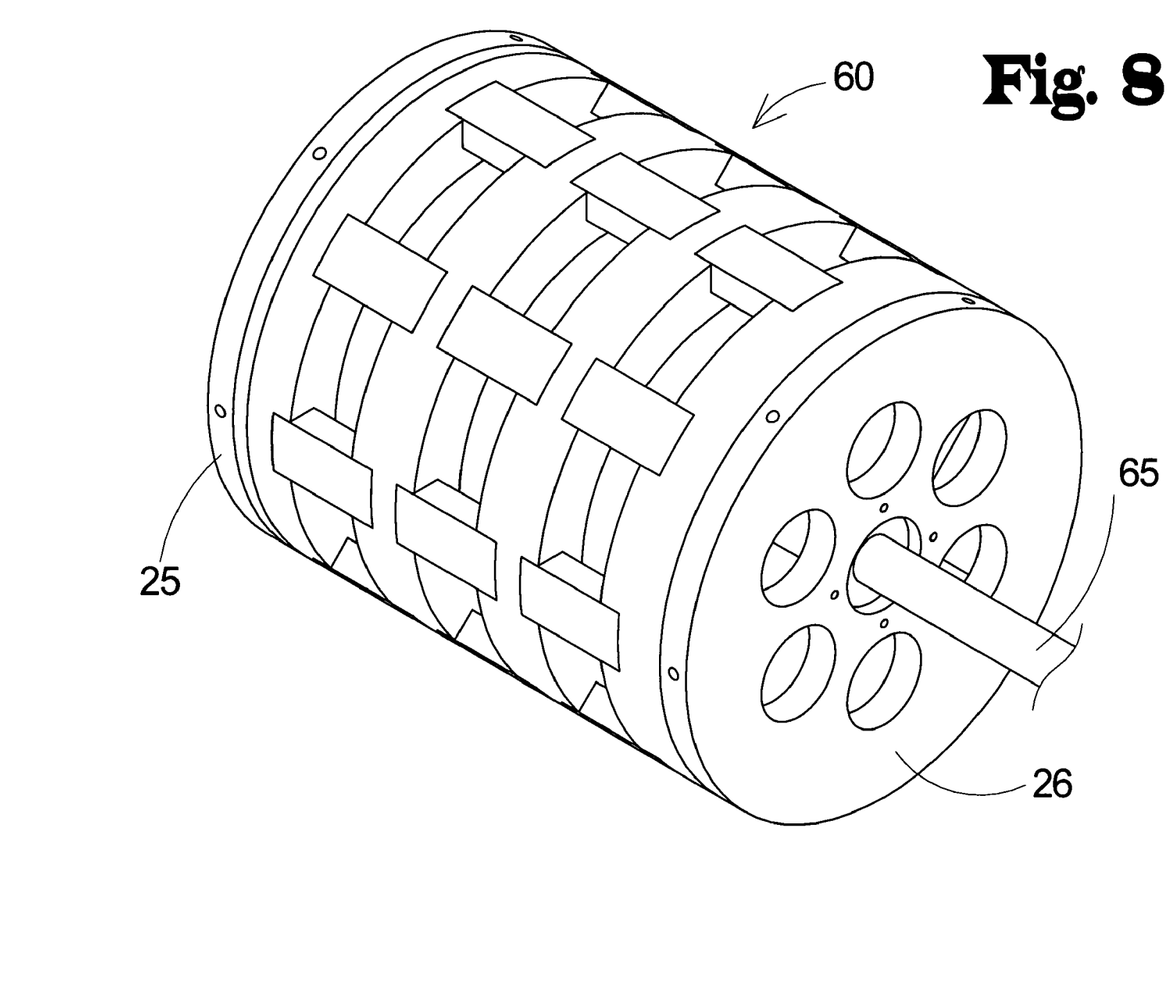
FIG. 8 is a schematic perspective view of the electric generator assembly of the present invention.

A first bearing plate 24 may be positioned at a first end of the first portion 21 of the housing for rotatably receiving a first end of the shaft member 65. Similarly, a second bearing plate 25 may be positioned at a first end of the second portion 22 of the housing 20 for rotatably receiving a second end of the shaft member 65. The first bearing plate 24 and the second bearing plate 25 rotatably support the weight of the shaft member 65.

Most preferably, a third bearing plate member 26 is positioned between the electric motor assembly 20 and the electric generator assembly 60 for rotatably supporting a medial portion of the shaft member 65.

Figure 5:
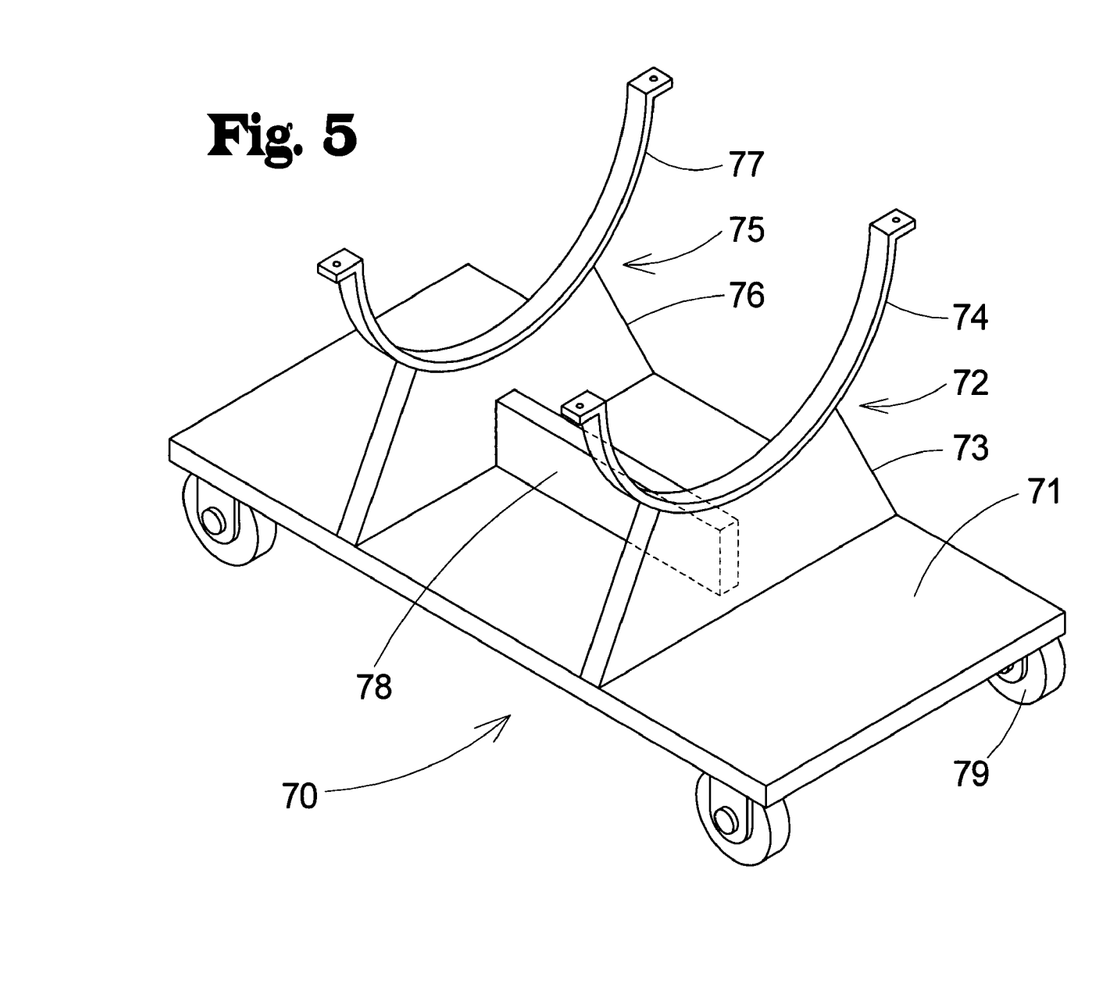
FIG. 5 is a schematic perspective view of the stand assembly of the present invention.

A stand assembly 70 may be included for supporting the housing 20 while the system is in use. In an embodiment the stand assembly 70 further comprises a base member 71, a first cradle member 72, and a second cradle member 75. The base member 71 includes a horizontal first surface. The first cradle member 72 includes a vertical support portion 73 extending upwardly from the base member 71, and an engagement portion 74 for abutting an exterior portion of the housing 20. The second cradle member 75 includes a second vertical support portion 76 extending upwardly from the base member 71, and a second engagement portion 77 for abutting a second exterior portion of the housing. A vertical stanchion 78 member may extend between the first cradle member 72 and the second cradle member 75. Further, a plurality of wheels 79 may operationally coupled to the stand assembly 70 for facilitating transport of the system.

Figure 9:
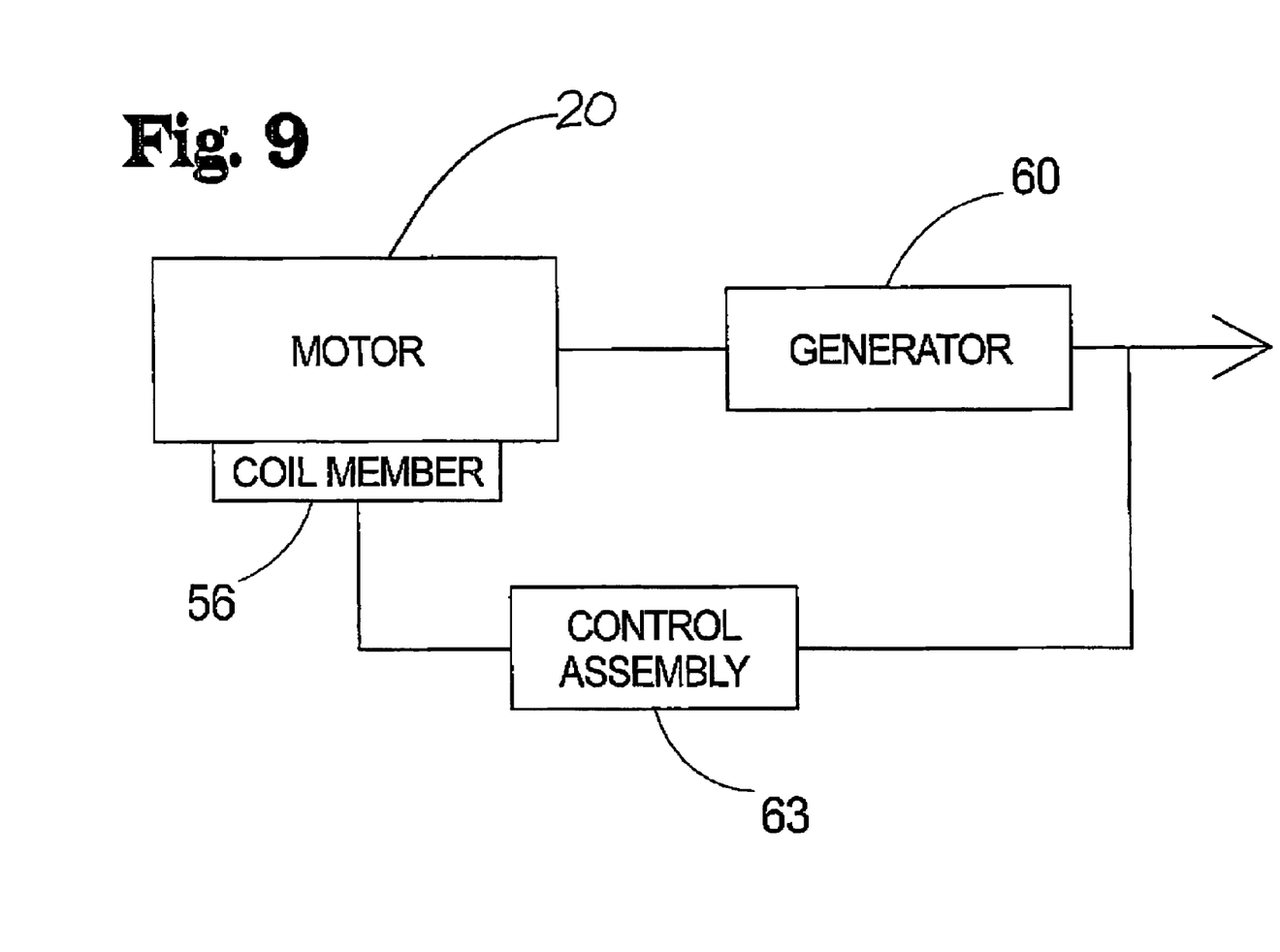
FIG. 9 is a schematic functional interconnect diagram of the present invention.

In use, the electric motor assembly is started by the application of an external current, or by physically inducing rotation of the magnetic drive wheels. This initial rotation causes the shaft member to rotate, which in turn rotates a generator magnet assembly past a plurality of generator coils generating electricity. At least a portion of the current generated is routed to the control assembly, modified and routed back to the plurality of coil members of the electric motor assembly. This current feedback can be used to increase or decrease the magnetic flux between the magnetic assemblies and the horse shoe shaped rare earth magnets changing the speed of rotation of the magnetic drive wheels.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motor-generator system with a current control feedback loop for enhanced efficiency comprising:
   a housing defining an interior space, said housing having a first portion and a second portion;
   an electric motor assembly positioned within said first portion of said housing, said electric motor portion being operationally coupled to a shaft member, said electric motor assembly selectively rotating said shaft member, said electric motor assembly comprising:
   a stator assembly operationally coupled to said first portion of said housing, said stator assembly having a plurality of magnetic members, said stator assembly being operationally coupled to said control assembly; and a rotor assembly positioned within said first portion of said housing, said rotor assembly being operationally coupled to said shaft member and comprising at least one fly wheel assembly, each said fly wheel assembly having at least one magnetic drive wheel with a plurality of magnetic assemblies dispersed in a linear array along a perimeter side wall of said at least one magnetic drive wheel assembly, and said at least one magnetic drive wheel assembly being operationally coupled to said shaft member whereby rotation of said magnetic drive wheel causes said shaft member to rotate;

an electric generator assembly operationally coupled to said shaft member, said electric generator assembly converting mechanical rotation into electrical energy, said electric generator assembly being positioned within said second portion of said housing, said electric generator assembly having a current output for supplying electrical current; and a control assembly connected to said electric generator assembly and said electric motor assembly for receiving a signal passing from said electric generator assembly to said electric motor assembly, said control assembly providing a control current to said electric motor assembly for controlling a speed of rotation of said shaft member produced by said electric motor assembly;

wherein said at least one magnetic drive wheel further comprises a plurality of bores extending radially into said perimeter side wall, each one of said bores being for receiving an associated one of said plurality of magnetic assemblies;

a plurality of apertures extending through a first side of said magnetic drive wheel into an associated one of said bores for selectively receiving a securing member to secure and associated one of said magnetic assemblies into said associated one of said plurality of bores.

2. A motor-generator system with a current control feedback loop for enhanced efficiency comprising:

a housing defining an interior space, said housing having a first portion and a second portion;

an electric motor assembly positioned within said first portion of said housing, said electric motor portion being operationally coupled to a shaft member, said electric motor assembly selectively rotating said shaft member, said electric motor assembly comprising:

a stator assembly operationally coupled to said first portion of said housing, said stator assembly having a plurality of magnetic members, said stator assembly being operationally coupled to said control assembly; and a rotor assembly positioned within said first portion of said housing, said rotor assembly being operationally coupled to said shaft member and comprising at least one fly wheel assembly, each said fly wheel assembly having at least one magnetic drive wheel with a plurality of magnetic assemblies dispersed in a linear array along a perimeter side wall of said at least one magnetic drive wheel assembly, and said at least one magnetic drive wheel assembly being operationally coupled to said shaft member whereby rotation of said magnetic drive wheel causes said shaft member to rotate;

an electric generator assembly operationally coupled to said shaft member, said electric generator assembly converting mechanical rotation into electrical energy, said electric generator assembly being positioned within said second portion of said housing, said electric generator assembly having a current output for supplying electrical current; and a control assembly connected to said electric generator assembly and said electric motor assembly for receiving a signal passing from said electric generator assembly to said electric motor assembly, said control assembly providing a control current to said electric motor assembly for controlling a speed of rotation of said shaft member produced by said electric motor assembly;

wherein each one of said plurality of magnetic assemblies further comprises:

a rare earth magnetic having a generally cylindrical form;

a bottom cap member operationally coupled to said rare earth magnet; and a perimeter wall extending upward from said bottom cap member and substantially enveloping a perimeter of said rare earth magnet, said perimeter wall has a notch portion extending downward from a top edge of said perimeter wall;

a top cap member operationally coupled to said perimeter wall, said top cap member abutting a top portion of said rare earth magnet, said top cap member being an arcuate segment;

wherein an outer edge of said arcuate segment top cap member extending through an arc of 80 degrees, said bottom cap member, said perimeter wall, and said top cap member comprising steel for directing magnetic lines of flux.

3. The system of claim 2, wherein said at least one magnetic drive wheel further comprises a plurality of bores extending radially into said perimeter side wall, each one of said bores being for receiving an associated one of said plurality of magnetic assemblies.

4. The system of claim 2, wherein said at least one magnetic drive wheel further comprises a plurality of voids extending from a first side of said magnetic drive wheel through to a second side of said magnetic drive wheels, said voids providing weight reduction for said flywheel.

5. The system of claim 4, wherein said plurality of voids being positioned symmetrically through said at least one magnetic drive wheel to maintain rotationally balance of said at least one magnetic drive wheel.

6. The system of claim 5, wherein said plurality of voids comprises four voids.

7. The system of claim 2, wherein said at least one magnetic drive wheel comprises a polymeric material to minimize weight of said at least one magnetic drive wheel.

8. A motor-generator system with a current control feedback loop for enhanced efficiency comprising:

a housing defining an interior space, said housing having a first portion and a second portion;

an electric motor assembly positioned within said first portion of said housing, said electric motor portion being operationally coupled to a shaft member, said electric motor assembly selectively rotating said shaft member;

an electric generator assembly operationally coupled to said shaft member, said electric generator assembly converting mechanical rotation into electrical energy, said electric generator assembly being positioned within said second portion of said housing, said electric generator assembly having a current output for supplying electrical current; and a control assembly connected to said electric generator assembly and said electric motor assembly for receiving a signal passing from said electric generator assembly to said electric motor assembly, said control assembly providing a control current to said electric motor assembly for controlling a speed of rotation of said shaft member produced by said electric motor assembly;

wherein said electric motor assembly further comprises:
a stator assembly operationally coupled to said first portion of said housing, said stator assembly having a plurality of magnetic members, said stator assembly being operationally coupled to said control assembly; and
a rotor assembly positioned within said first portion of said housing, said rotor assembly being operationally coupled to said shaft member;

wherein said rotor assembly further comprises at least one fly wheel assembly, said fly wheel assembly including at least one magnetic drive wheel with a plurality of magnetic assemblies dispersed in a linear array along a perimeter side wall of said at least one magnetic drive wheel assembly being operationally coupled to said shaft member whereby rotation of said magnetic drive wheel causes said shaft member to rotate;

wherein each one of said plurality of magnetic assemblies further comprises:
a rare earth magnet having a generally cylindrical form;
a bottom cap member operationally coupled to said rare earth magnet; and
a perimeter wall extending upward from said bottom cap member and substantially enveloping a perimeter of said rare earth magnet.

9. The system of claim 8, wherein said perimeter wall has a notch portion extending downward from a top edge of said perimeter wall.

10. The system of claim 8, further comprising a top cap member operationally coupled to said perimeter wall, said to cap member abutting a top portion of said rare earth magnet.

11. The system of claim 10, wherein said top cap member being an arcuate segment.

12. The system of claim 11, wherein an outer edge of said arcuate segment top cap member extending through an arc of between 45 and 180 degrees inclusive.

13. The system of claim 11, wherein an outer edge of said arcuate segment top cap member extending through an arc of 80 degrees.

14. A motor-generator system with a current control feedback loop for enhanced efficiency comprising:
a housing defining an interior space, said housing having a first portion and a second portion;
an electric motor assembly positioned within said first portion of said housing, said electric motor portion being operationally coupled to a shaft member, said electric motor assembly selectively rotating said shaft member;
an electric generator assembly operationally coupled to said shaft member, said electric generator assembly converting mechanical rotation into electrical energy, said electric generator assembly being positioned within said second portion of said housing, said electric generator assembly having a current output for supplying electrical current;
a control assembly coupled to said electric generator assembly and said electric motor assembly for receiving a signal passing from said electric generator assembly to said electric motor assembly, said control assembly providing a control current to said electric motor assembly for controlling a speed of rotation of said shaft member produced by said electric motor assembly, said electric motor assembly having a pair of magnetic drive wheels, each one of said pair of magnetic drive wheels further comprises:
a plurality of bores extending radially into said perimeter side wall, each one of said bores being for receiving an associate one of said plurality of magnetic assemblies;
a plurality of apertures extending through a first side of said magnetic drive wheel into an associated one of said bores for selectively receiving a securing member to secure and associated one of said magnetic assemblies into said associated one of said plurality of bores;
a plurality of voids extending from a first side of said magnetic drive wheel through to a second side of said magnetic drive wheels, said voids providing weight reduction for said flywheel, said plurality of voids being positioned symmetrically through said at least one magnetic drive wheel to maintain rotationally balance of said at least one magnetic drive wheel;

wherein said magnetic drive wheel comprises a polymeric material to minimize weight of said at least one magnetic drive wheel;

wherein each one of said plurality of magnetic assemblies further comprises:
a rare earth magnetic having a generally cylindrical form;
a bottom cap member operationally coupled to said rare earth magnet; and
a perimeter wall extending upward from said bottom cap member and substantially enveloping a perimeter of said rare earth magnet, said perimeter wall has a notch portion extending downward from a top edge of said perimeter wall;
a top cap member operationally coupled to said perimeter wall, said to cap member abutting a top portion of said rare earth magnet, said top cap member being an arcuate segment;
wherein an outer edge of said arcuate segment top cap member extending through an arc of 80 degrees,
said bottom cap member, said perimeter wall, and said top cap member comprising steel for directing magnetic lines of flux;

wherein said stator assembly further comprises:
a plurality of rare earth magnets having a general horseshoe shape with complementary poles portioned on each end of said horse shoe shape;
a plurality of coil members, each one of said plurality of coil members being wrapped around an associated one of said plurality of horse show shaped rare earth magnets, each one of said plurality of coil member being operationally coupled to said control assembly.

15. The system of claim 14, wherein a first one of said pair of magnetic drive wheels being offset from a second one of said pair of magnetic drive wheels whereby said magnetic assemblies of said first one of said pair of magnetic drive wheels are not aligned with said magnetic assemblies of said second one of said pair of magnetic drive wheel.

16. The system of claim 15, further comprising:
said magnetic assemblies of said first one of said pair of magnetic drive wheels being aligned with a first end of said horse shoe shaped rare earth magnet of said stator assembly, each one of said magnetic assemblies of said first one of said pair of magnetic drive wheels having a first magnetic polarity, said first end of said horse shoe shaped rare earth magnet of said stator assembly having an identical first magnetic polarity whereby said first end of said horse shoe shaped rare earth magnet of said stator assembly repels each one of said magnetic assemblies of said first one of said pair of magnetic drive wheels; and said magnetic assemblies of said second one of said pair of magnetic drive wheels being aligned with a second end of said horse shoe shaped rare earth magnet of said stator assembly, each one of said magnetic assemblies of said second one of said pair of magnetic drive wheels having a second magnetic polarity, said second end of said horse shoe shaped rare earth magnet of said stator assembly having an identical second magnetic polarity whereby said second end of said horse shoe shaped rare earth magnet of said stator assembly repels each one of said magnetic assemblies of said second one of said pair of magnetic drive wheels.

17. The system of claim 14, further comprising:
a first bearing plate positioned at a first end of said first portion of said housing for rotatably receiving a first end of said shaft member;
a second bearing plate positioned at a first end of said second portion of said housing for rotatably receiving a second end of said shaft member; and
said first bearing plate and said second bearing plate rotatably supporting weight of said shaft member.

18. The system of claim 17, further comprising a third bearing plate member positioned between said electric motor assembly and said electric generator assembly for rotatably supporting a medial portion of said shaft member.

19. The system of claim 14, further comprising a stand assembly for supporting said housing while said system is in use.

20. The system of claim 19, wherein said stand assembly further comprises:
a base member having a horizontal first surface;
a first cradle member having a vertical support portion extending upwardly from said base member, said first cradle member having an engagement portion for abutting an exterior portion of said housing; and
a second cradle member having a second vertical support portion extending upwardly from said base member, said second cradle member having a second engagement portion for abutting a second exterior portion of said housing.

21. The system of claim 20, further comprising a vertical stanchion member extending between said first cradle member and said second cradle member.

22. The system of claim 19, further comprising a plurality of wheels operationally coupled to said stand assembly for facilitating transport of said system.

23. A motor-generator system with a current control feedback loop for enhanced efficiency comprising:
a housing defining an interior space, said housing having a first portion and a second portion;
an electric motor assembly positioned within said first portion of said housing, said electric motor portion being operationally coupled to a shaft member, said electric motor assembly selectively rotating said shaft member, said electric motor assembly comprising:
a stator assembly operationally coupled to said first portion of said housing, said stator assembly having a plurality of magnetic members, said stator assembly being operationally coupled to said control assembly; and a rotor assembly positioned within said first portion of said housing, said rotor assembly being operationally coupled to said shaft member and comprising at least one fly wheel assembly, each said fly wheel assembly having at least one magnetic drive wheel with a plurality of magnetic assemblies dispersed in a linear array along a perimeter side wall of said at least one magnetic drive wheel assembly, and said at least one magnetic drive wheel assembly being operationally coupled to said shaft member whereby rotation of said magnetic drive wheel causes said shaft member to rotate;
an electric generator assembly operationally coupled to said shaft member, said electric generator assembly converting mechanical rotation into electrical energy, said electric generator assembly being positioned within said second portion of said housing, said electric generator assembly having a current output for supplying electrical current; and
a control assembly connected to said electric generator assembly and said electric motor assembly for receiving a signal passing from said electric generator assembly to said electric motor assembly, said control assembly providing a control current to said electric motor assembly for controlling a speed of rotation of said shaft member produced by said electric motor assembly;
a pair of magnetic drive wheels, each one of said pair of magnetic drive wheels further comprises:
a plurality of bores extending radially into said perimeter side wall, each one of said bores being for receiving an associate one of said plurality of magnetic assemblies;
a plurality of apertures extending through a first side of said magnetic drive wheel into an associated one of said bores for selectively receiving a securing member to secure and associated one of said magnetic assemblies into said associated one of said plurality of bores;
a plurality of voids extending from a first side of said magnetic drive wheel through to a second side of said magnetic drive wheels, said voids providing weight reduction for said flywheel, said plurality of voids being positioned symmetrically through said at least one magnetic drive wheel to maintain rotationally balance of said at least one magnetic drive wheel;
wherein said magnetic drive wheel comprises a polymeric material to minimize weight of said at least one magnetic drive wheel.

24. A motor-generator system with a current control feedback loop for enhanced efficiency comprising:
a housing defining an interior space, said housing having a first portion and a second portion;
an electric motor assembly positioned within said first portion of said housing, said electric motor portion being operationally coupled to a shaft member, said electric motor assembly selectively rotating said shaft member;
an electric generator assembly operationally coupled to said shaft member, said electric generator assembly converting mechanical rotation into electrical energy, said electric generator assembly being positioned within said second portion of said housing, said electric generator assembly having a current output for supplying electrical current; and
a control assembly connected to said electric generator assembly and said electric motor assembly for receiving a signal passing from said electric generator assembly to said electric motor assembly, said control assembly providing a control current to said electric motor assembly for controlling a speed of rotation of said shaft member produced by said electric motor assembly;

wherein said electric motor assembly further comprises:
  a stator assembly operationally coupled to said first portion of said housing, said stator assembly having a plurality of magnetic members, said stator assembly being operationally coupled to said control assembly; and
  a rotor assembly positioned within said first portion of said housing, said rotor assembly being operationally coupled to said shaft member;

wherein said rotor assembly further comprises at least one fly wheel assembly, said fly wheel assembly including at least one magnetic drive wheel with a plurality of magnetic assemblies dispersed in a linear array along a perimeter side wall of said at least one magnetic drive wheel assembly being operationally coupled to said shaft member whereby rotation of said magnetic drive wheel causes said shaft member to rotate;

wherein said stator assembly further comprises:
  a plurality of rare earth magnets having a general horse-shoe shape with complementary poles portioned on each end of said horse shoe shape;
  a plurality of coil members, each one of said plurality of coil members being wrapped around an associated one of said plurality of horse shoe shaped rare earth magnets, each one of said plurality of coil member being operationally coupled to said control assembly.

* * * * *